(12) United States Patent
Ohara

(10) Patent No.: US 11,689,680 B2
(45) Date of Patent: Jun. 27, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Kota Ohara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 358 days.

(21) Appl. No.: 16/908,742

(22) Filed: Jun. 23, 2020

(65) Prior Publication Data

US 2021/0218862 A1 Jul. 15, 2021

(30) Foreign Application Priority Data

Jan. 9, 2020 (JP) .................................. 2020-002220

(51) Int. Cl.
*H04N 1/32* (2006.01)
*H04N 1/00* (2006.01)

(52) U.S. Cl.
CPC ....... *H04N 1/3208* (2013.01); *H04N 1/00214* (2013.01); *H04N 1/00427* (2013.01); *H04N 1/32101* (2013.01)

(58) Field of Classification Search
CPC ............. H04N 1/3208; H04N 1/00214; H04N 1/00427; H04N 1/32101
See application file for complete search history.

(56) References Cited

U.S. PATENT DOCUMENTS

| | | | |
|---|---|---|---|
| 2006/0059012 A1* | 3/2006 | Thompson | G16H 10/60 705/2 |
| 2011/0216355 A1* | 9/2011 | Takei | G06F 15/00 358/1.15 |
| 2014/0156650 A1* | 6/2014 | Jacobson | G06Q 10/10 707/723 |

FOREIGN PATENT DOCUMENTS

| | | |
|---|---|---|
| JP | 2016066865 | 4/2016 |
| JP | 6375827 | 8/2018 |

* cited by examiner

*Primary Examiner* — Iriana Cruz
(74) *Attorney, Agent, or Firm* — JCIPRNET

(57) ABSTRACT

An information processing apparatus includes a processor configured to display a screen on which plural destination candidates and a GUI component that receives an instruction to end selection are displayed, receive the selection of the destination from plural destination candidates displayed on the screen, end the display of the screen in a case where the instruction to end the selection is received by the GUI component, and end the display of the screen even though the instruction to end the selection is not received by the GUI component, when a single or plural selected destinations satisfy a predetermined condition.

8 Claims, 14 Drawing Sheets

FIG. 4

| ↑ LATEST | TRANSMISSION DESTINATION |
|---|---|
| 1 | DESTINATION B, DESTINATION C |
| 2 | DESTINATION A, DESTINATION B, DESTINATION C |
| 3 | DESTINATION D |
| 4 | DESTINATION A |
| 5 | DESTINATION C |
| 6 | DESTINATION A |
| 7 | DESTINATION A, DESTINATION C |

FIG. 7

| ↑ LATEST | TRANSMISSION DESTINATION |
|---|---|
| 1 | DESTINATION B, DESTINATION C |
| 2 | DESTINATION A |
| 3 | DESTINATION D |
| 4 | DESTINATION A |
| 5 | DESTINATION C |
| 6 | DESTINATION A |
| 7 | DESTINATION A, DESTINATION C |

FIG. 13

| ↑ LATEST | TRANSMISSION DESTINATION | SENDER |
|---|---|---|
| 1 | DESTINATION B, DESTINATION C | B |
| 2 | DESTINATION A | A |
| 3 | DESTINATION D | A |
| 4 | DESTINATION A, DESTINATION D | D |
| 5 | DESTINATION C | A |
| 6 | DESTINATION A, DESTINATION C | A |
| 7 | DESTINATION A, DESTINATION C | C |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-002220 filed Jan. 9, 2020.

BACKGROUND

(i) Technical Field

The present invention relates to an information processing apparatus and a non-transitory computer readable medium storing a program.

(ii) Related Art

As a user interface (UI) screen used when an information processing apparatus receives an input of a communication destination from a user, a user interface screen on which a plurality of destination candidates registered in advance are displayed as choices is provided. This type of screen is referred to, for example, as a destination table screen or an address book screen. Such a type of screen is assumed to be referred to as a destination table screen below.

There is a method in which a destination table screen and a transmission screen for receiving an instruction to perform transmission are prepared as separate screens, and the latter is called by the former is called by the latter to select a destination. In the method, a button (referred to a "close" button) that receives an instruction to close the destination table screen is provided on the destination table screen. The "close" button may be considered as a button for issuing an instruction to end the selection of a destination on the destination table screen. A user selects one or more intended destinations on the destination table screen called from the transmission screen. Then, the user presses the "close" button in the destination table screen to close the destination table screen. Thus, the transmission screen on which the selected destination is displayed is displayed, and the user performs an instruction of transmission on the transmission screen. In a case of selecting a destination using the destination table screen, an operation of closing a destination table screen is required in addition to an operation of calling the destination table screen and an operation of selecting a destination on the destination table screen.

Regarding a facsimile device disclosed in JP6375827B (JP2016-066865A), in a case where a number button or a telephone directory button is pressed, the facsimile device turns into a single-station transmission mode in which a single destination is to be received. In a case where an OK button is pressed, the facsimile device turns into a broadcast transmission mode in which a plurality of destinations are to be received.

SUMMARY

Aspects of non-limiting embodiments of the present disclosure relate to an information processing apparatus and a non-transitory computer readable medium storing a program, in which, in a method of receiving selection of a single destination or a plurality of destinations for the current transmission from a screen on which a plurality of destination candidates are displayed, the number of user operations for destination selection is reduced in comparison to a case where displaying the screen is not ended, until an explicit instruction indicating the end of selection is received from a user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provide an information processing apparatus including a processor configured to display a screen on which a plurality of destination candidates and a GUI component that receives an instruction to end selection are displayed, receive the selection of the destination from the plurality of destination candidates displayed on the screen, end the display of the screen in a case where the instruction to end the selection is received by the GUI component, and end the display of the screen even though the instruction to end the selection is not received by the GUI component, when a single or a plurality of selected destinations satisfy a predetermined condition.

BRIEF DESCRIPTION OF THE DRAWINGS

Exemplary embodiment(s) of the present invention will be described in detail based on the following figures, wherein:

FIG. 4 is a diagram illustrating an example of transmission history information;

FIG. 7 is a diagram illustrating another example of the transmission history information;

FIG. 13 is a diagram illustrating an example of the transmission history information including a sender field.

DETAILED DESCRIPTION

Example of Hardware Configuration

Figure 1:
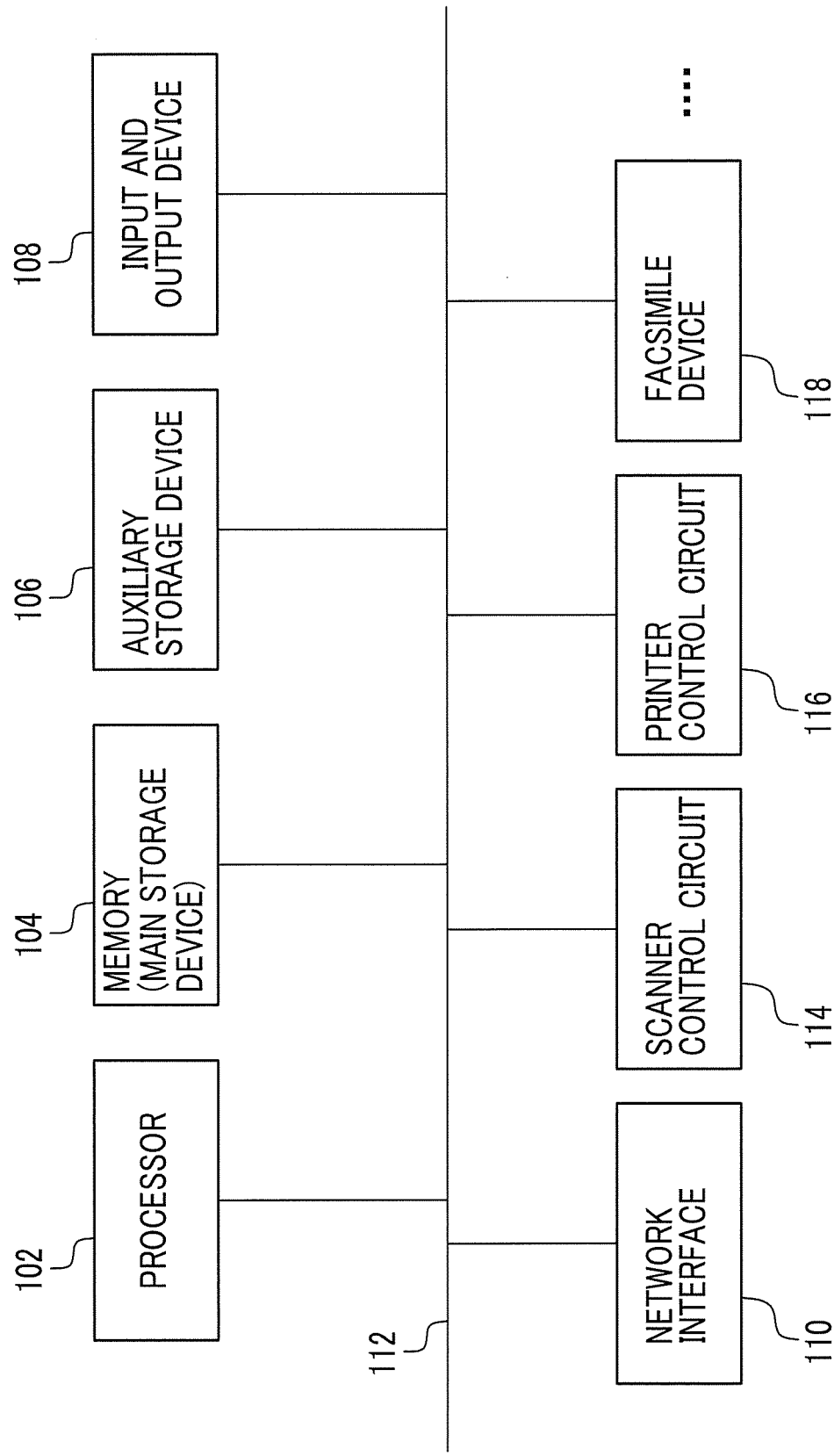
FIG. 1 is a diagram illustrating a hardware configuration of a computer included in an information processing apparatus.

FIG. 1 illustrates a hardware configuration of an information processing apparatus according to an exemplary embodiment. The example illustrated in FIG. 1 is for a case where the information processing apparatus is a so-called multifunctional device. The multifunctional device is a device that has functions of, for example, a printer, a scanner, a copying machine, and a facsimile device together. The multifunctional device may have a function of receiving a request from a client such as a personal computer via a network such as a local area network or communicating with a server or the like on the Internet.

As illustrated in FIG. 1, for example, the information processing apparatus has a circuit configuration as hardware. In the circuit configuration, a processor 102, a memory (main storage device) 104 such as a random access memory (RAM), a controller that controls an auxiliary storage device 106 being a non-volatile storage device such as a flash memory, a solid state drive (SSD), and a hard disk drive (HDD), an interface with various input and output devices 108, and a network interface 110 that performs control for a connection with a network such as a local area network are connected to each other via a data transmission path such as a bus 112, for example. The input and output device 108 includes, for example, an input device with a display device such as a touch panel, a sound output device such as a speaker, and a card reader for user authentication. The circuit configuration of the above-described portion may be similar to a circuit configuration of a general-purpose computer.

The information processing apparatus includes a scanner control circuit 114, a printer control circuit 116, a facsimile device 118, and the like which are connected to the computer portion via the bus 112 or the like. The circuits are provided for various functions of the information processing apparatus (multifunctional device in this example). The scanner control circuit 114 is a circuit for controlling a scanner and an automatic document feeder built in the multifunctional device. The printer control circuit 116 is a circuit for controlling a printer built in the multifunctional device. The facsimile device 118 is a device having a facsimile transmission and reception function of the multifunctional device.

The computer portion of the information processing apparatus performs information processing of processing for a user interface (UI), control of transmitting and receiving data via a network, and control of various functional elements such as a scanner, a printer, and a facsimile device. A program in which the contents of the various types of information processing are described is installed on a computer via a network or the like and saved in the auxiliary storage device 106. The program stored in the auxiliary storage device 106 is executed by the processor 102 using the memory 104, thereby the information processing apparatus in the exemplary embodiment is realized.

Here, the term "processor" 102 refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic devices).

In the embodiments above, the term "processor" 102 is broad enough to encompass one processor 102 or plural processors 102 in collaboration which are located physically apart from each other but may work cooperatively. The order of operations of the processor 102 is not limited to one described in the embodiment above, and may be changed.

In this specification, a case where the information processing apparatus is realized as a multifunctional device will be described as an example. However, the information processing apparatus in the exemplary embodiment may be various apparatuses other than the multifunctional device, for example, be a kiosk terminal, a smartphone, a tablet terminal, or a personal computer.

Example of Screen Transition Between Transmission Screen and Destination Table Screen The exemplary embodiment relates to display control of a UI screen for a transmission destination in a case where data is transmitted from an information processing apparatus to another device. There are various types of data transmission, such as electronic mail transmission, facsimile transmission, and data transfer using a data transfer protocol such as FTP. In many cases, the multifunctional device attaches an image obtained by scanning of a built-in scanner to an electronic mail or transmits the image to a destination as a facsimile.

Figure 2:
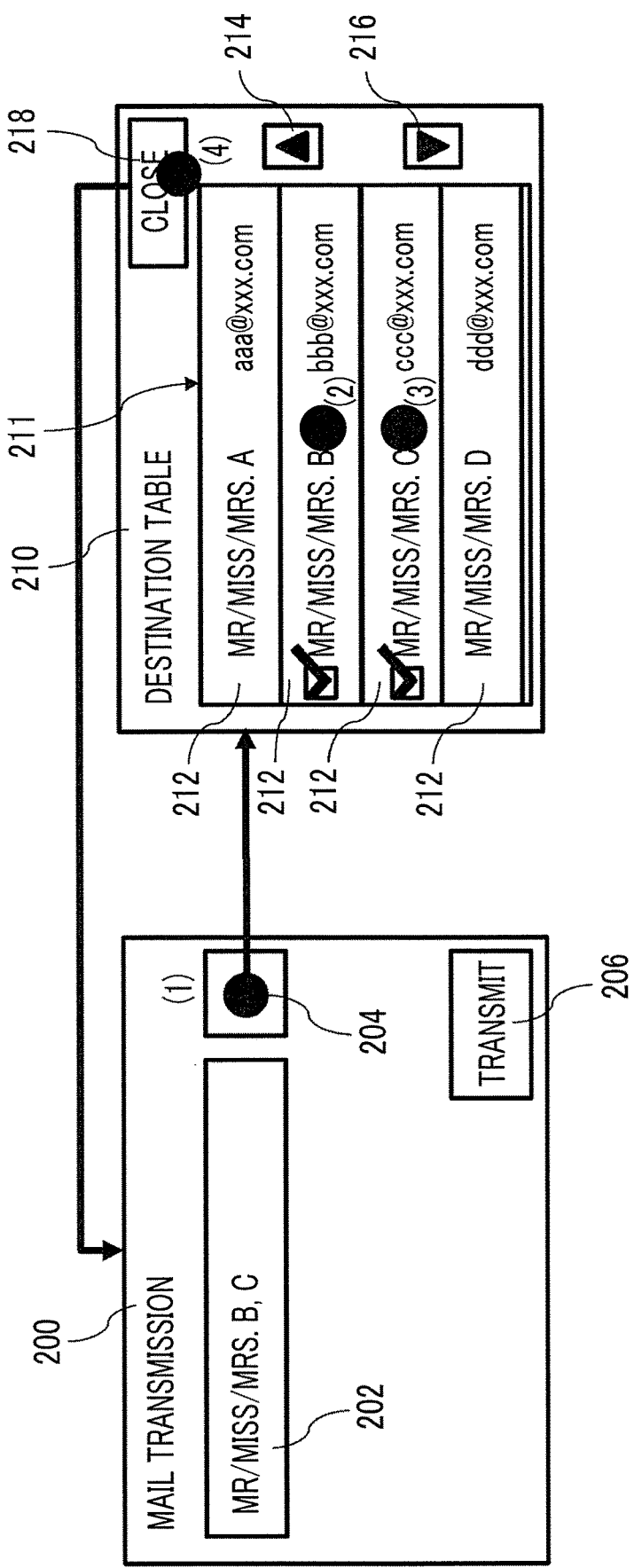
FIG. 2 is a diagram illustrating an example of a destination table screen.

FIG. 2 illustrates an example of a mail transmission screen 200 and a destination table screen 210 forming a UI of the information processing apparatus, that is provided for transmitting an electronic mail. In this example, the information processing apparatus includes a touch panel as a display device. The mail transmission screen 200 and the destination table screen 210 are configured as a graphical UI (GUI) screen corresponding to a touch input of a user on the touch panel.

As a UI screen of a mail client application for a personal computer, a UI screen on which a destination table, a list of destinations selected from the destination table, a button for an instruction to perform transmission, a title and a body text of an electronic mail, and the like are collectively displayed on one screen may be provided. In a case of a device having a large screen, such as a personal computer, there is no problem with a UI screen in which various elements are packed in one screen as described above. However, in a case of a device having a relatively small screen, such as a multifunctional device, in a case where a destination table, a list of destinations selected from the destination table, and the like are displayed together on one screen, the visibility and operability become deteriorated. Thus, a device having a relatively small screen may employ a configuration in which the mail transmission screen 200 and the destination table screen 210 are provided to be separate screens as illustrated in FIG. 2.

In this example, the mail transmission screen 200 includes a destination field 202, a destination table call button 204, and a transmission button 206. In the destination field 202, one or more destinations, such as a destination input by a user with a keyboard or the like, or a destination selected from a destination table, are listed with a predetermined delimiter such as a comma interposed therebetween. The mail transmission function of the information processing apparatus manages a destination list that is a list of destinations displayed in the destination field 202. A destination table call button 204 refers to a GUI component for calling the destination table screen 210. The GUI component is a component that forming a GUI screen and is used to receive an input from a user. Buttons, input fields, check boxes, and the like are examples of GUI components. In a case where the user presses the destination table call button 204 by a touch operation or the like, the destination table screen 210 instead of the mail transmission screen 200 that has been displayed until that is displayed on the display device in the information processing apparatus. A transmission button 206 is a GUI component for receiving an instruction to transmit an electronic mail. In a case where the user presses the transmission button 206 in a state where one or more destination mail addresses are input in the destination field 202, the information processing apparatus transmits an electronic mail as a transmission target, to each of the destinations listed in the destination field 202. For example, in a case where the user uses a function of scanning an original document and transmitting the resultant of the scanning by electronic mail, in a case where the transmission button 206 is pressed, the information processing apparatus performs scanning of the original document set on the scanner, creates an electronic mail to which a scan image obtained by the scanning is attached, and transmits the electronic mail to each destination in the destination field 202.

A destination table 211 listing a plurality of destination candidates 212 is displayed on the destination table screen 210. In a case where many destination candidates 212 are provided, and thus it is not possible to display all the destination candidates on the screen, for example, scroll buttons 214 and 216 are displayed on the destination table screen 210. The user presses the scroll buttons 214 and 216 to scroll the destination candidates 212 displayed on the screen. In a case where the user touches the destination candidate 212 in the not-selected state, the destination candidate 212 becomes the selected state. In a case where the user touches the destination candidate 212 in the selected state, the destination candidate 212 changes to the not-selected state. The destination candidate in the selected state is incorporated in a destination list managed by the mail transmission function of the information processing apparatus, as the destination selected by the user. In the example illustrated in FIG. 2, a check box with a check mark is displayed on the destination candidate 212 in the selected state, and a check box with a check mark is not displayed on the destination candidate 212 in the not-selected state. In a case where a close button 218 is pressed, the information processing apparatus closes the destination table screen 210 (that is, ends the display of the destination table screen 210). Thus, the mail transmission screen 200 that is the calling source of the destination table screen 210 is displayed again on the display device in the information processing apparatus. One or more destinations selected on the destination table screen 210 are added to the destination field 202 in the mail transmission screen 200 displayed at this time.

In the example of FIG. 2, (1) in a case where the user presses the destination table call button 204 on the mail transmission screen 200 in which the destination field 202 is empty, the screen displayed on the display device in the information processing apparatus is transitioned from the mail transmission screen 200 to the destination table screen 210. At this point, all destination candidates 212 in the destination table 211 displayed in the destination table screen 210 are in the not-selected state. Then, the user (2) selects a destination candidate "Mr/Miss/Mrs. B" in the destination table 211, as a destination, and (3) further selects a destination candidate "Mr/Miss/Mrs. C" as the destination. Then, the user (4) presses the close button 218. Thus, the destination table screen 210 is closed, and the mail transmission screen 200 is displayed again instead. In the destination field 202 of the mail transmission screen 200 displayed at this time, "Mr/Miss/Mrs. B" and "Mr/Miss/Mrs. C" selected on the destination table screen 210 are listed as the destinations.

The destination table screen 210 illustrated in FIG. 2 is designed to return to the screen (mail transmission screen 200 in this example) as the transition source in response to an explicit instruction of the user to press the close button 218. Therefore, it is required to press the close button 218 in a case where a plurality of destinations are selected from the destination table 211 or only one destination is selected.

Figure 3:
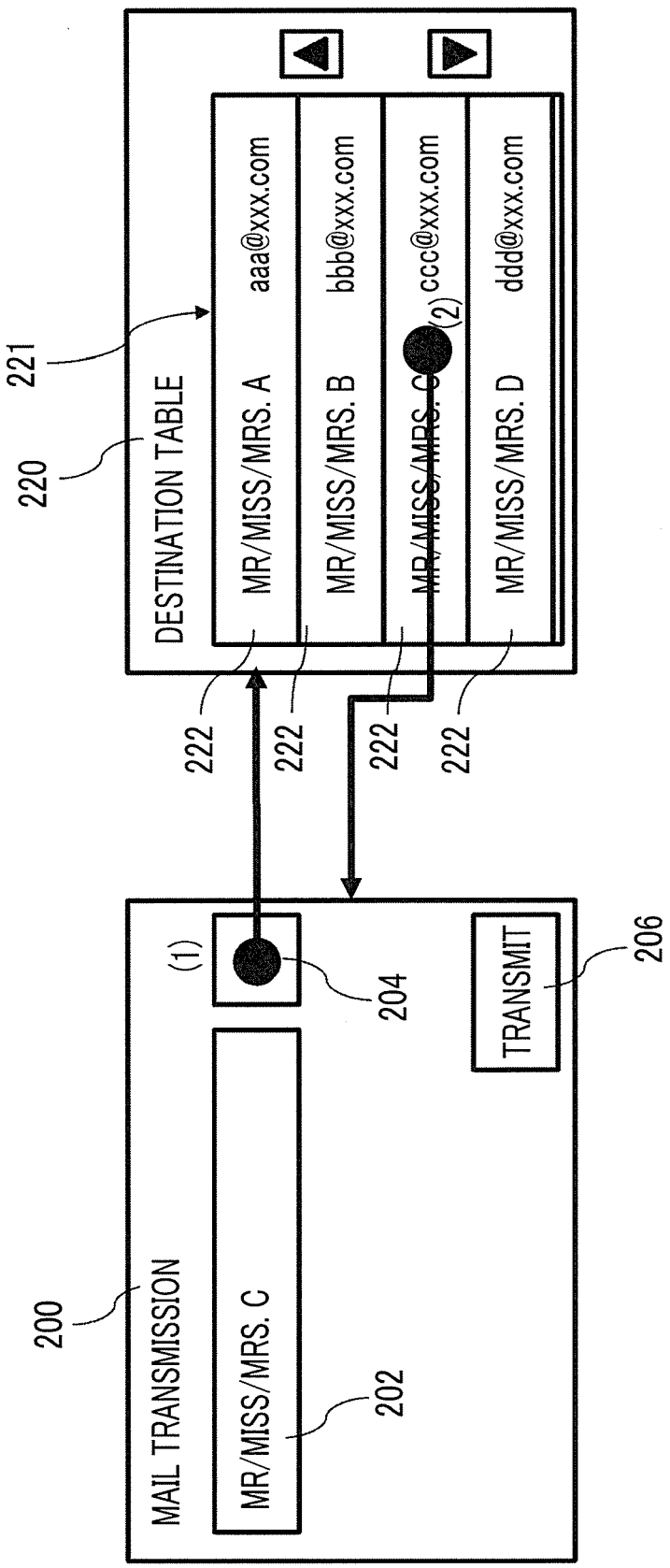
FIG. 3 is a diagram illustrating another example of the destination table screen.

FIG. 3 illustrates another example of the UI of the information processing apparatus, that is provided for transmitting an electronic mail. The UI in this example includes the mail transmission screen 200 and a destination table screen 220. The mail transmission screen 200 is identical to the mail transmission screen in the example of FIG. 2. Different from the destination table screen 210 illustrated in FIG. 2, the destination table screen 220 does not include a GUI component corresponding to the close button 218.

In a case where the user selects one destination candidate 222 included in the destination table 221 in the destination table screen 220, the information processing apparatus closes the destination table screen 220.

That is, in the example of FIG. 3, (1) in a case where the user presses the destination table call button 204 on the mail transmission screen 200 in which the destination field 202 is empty, the screen displayed on the display device in the information processing apparatus is transitioned from the mail transmission screen 200 to the destination table screen 220. At this point, all the destination candidates 222 in the destination table 221 are in the not-selected state. Then, the user (2) selects the destination candidate "Mr/Miss/Mrs. C" in the destination table 211 as the destination. In a case where the user selects the destination candidate "Mr/Miss/Mrs. C", the information processing apparatus adds "Mr/Miss/Mrs. C" to the destination list and brings the displayed screen from the destination table screen 220 back to the mail transmission screen 200 as the transition source. In the destination field 202 of the mail transmission screen 200 displayed at this time, "Mr/Miss/Mrs. C" selected on the destination table screen 220 is displayed as the destination.

The destination table screen 220 in FIG. 3 is designed to automatically close in a case where one destination is selected, and thus the user may not explicitly perform a closing operation. However, in a case where the user intends to select a plurality of destinations, the user is required to perform an operation of calling the destination table screen 220 every time one destination is selected.

As described above, in the UI of FIG. 2, it takes time and effort to press the close button 218 even in a case where there is one destination, but there is an advantage that the destination table may be closed only once even in a case where there are a plurality of destinations. In the UI of FIG. 3, in a case where there is one destination, the destination may be just selected on the destination table screen 220, and other operations of closing the destination table screen 220 are not required. However, it is necessary to call the destination table screen 220 many times in a case where the user intends to select a plurality of destinations. As described above, the UIs illustrated in FIGS. 2 and 3 have both advantages and disadvantages in terms of the operation burden of the user.

Accordingly, in the exemplary embodiment, a method of intelligently performing the process of closing the destination table screen 210 using information such as the previous transmission history is provided.

Control of Automatically Closing Destination Table Screen

In the UI for mail transmission in the exemplary embodiment, as illustrated in FIG. 2, the destination table screen 210 including the close button 218 is used. In the example of FIG. 2, the user has need to press the close button 218 in order to close the destination table screen 210. However, in the exemplary embodiment, the destination table screen 210 may be automatically closed even though the close button 218 is not pressed.

In this UI, even in a case where the user does not press the close button 218, in a case where a predetermined condition is satisfied, the destination table screen 210 is closed, and a screen to be displayed is transitioned to the mail transmission screen 200. Here, the condition includes a condition related to the destination selected by the user, a condition related to the destination of transmission previously performed by the information processing apparatus, a condition related to data as a transmission target, and the like. For example, the destination table screen 210 is automatically closed at a time point at which a combination of destinations which is recorded in transmission history information of the information processing apparatus and is identical to a combination in the previous transmission is selected. In a case where the user closes the destination table screen 210 in a state where the condition is not satisfied, it is required to press the close button 218.

The destination table screen 220 illustrated in FIG. 3 is required to be closed every time the user selects one destination, but whether the destination table screen 210 in the exemplary embodiment is closed is controlled depending on whether or not the condition is satisfied, in a case where the user selects the destination.

Some examples of control for closing the destination table screen 210 will be described below.

In each of examples as follows, in the mail transmission function of the information processing apparatus, every time an operation to press the transmission button 206 is received from the user, a history record including a list of destinations to which transmission has been performed in response to the operation is stored in the auxiliary storage device 106, for example. The history record is a record that holds history information about one transmission. The history record includes at least a list of destinations for the transmission. Regarding the mail transmission, the auxiliary storage device 106 stores, for example, a history record of a latest predetermined number of transmissions or a history record of a transmission performed within a latest period of a predetermined length of time. In a case where the number of stored history records exceeds a predetermined number, the oldest history records are deleted in order. A history record in which the transmission date and time is earlier than the latest predetermined period is deleted while the time passes. The transmission history information is a set of history records stored in the auxiliary storage device 106.

In each of the examples as follows, for easy understanding, a configuration in which entirety of the information processing apparatus manages one piece of transmission history information is used as an example. In the configuration, the information processing apparatus records a history record of any transmission as one element of single transmission history information in the information processing apparatus, regardless of a person who has performed an instruction to transmit a mail. The information processing apparatus refers to the single transmission history information in a case of control to close the destination table screen 210, regardless of a person who is operating the information processing apparatus.

The information processing apparatus may have a configuration in which, in a case where the information processing apparatus records transmission history information for each user and performs control to close the destination table screen 210, the information processing apparatus refers to transmission history information of a user who is operating the information processing apparatus at that time.

Example 1 of Control

A first example of such control will be described with reference to FIGS. 4 and 5.

In the first example, in a case where a destination selected by the user on the destination table screen 210 satisfies a specific condition (referred to as Condition 1) in relation to the transmission history information, the destination table screen 210 is closed. In particular, in this example, in a case where, as a result of the selection of the destination by the user on the destination table screen 210, a plurality of destinations selected by the user satisfy a condition (referred to as Condition 2) of coinciding with the set of destinations in any history record in the transmission history information, the destination table screen 210 is closed. Condition 2 may be considered as a condition that "the transmission history information indicates that transmission to only a plurality of destinations identical to a plurality of destinations selected by the user has been previously performed". Condition 2 is a condition in which Condition 1 is further limited.

More strictly, in this example, in a case where a condition (referred to as Condition 3) that, in particular, the transmission history information includes a history record indicating transmission performed after a plurality of identical destinations are selected in order identical to an order in which the plurality of destinations are selected from the user is satisfied, the destination table screen 210 is closed. Condition 3 is a condition in which Condition 2 is further limited.

In the first example and other examples described later, even in a case where a destination is input in a manner different from a manner of being selected from the destination table 211, for example, in a case where the user manually inputs the destination with a keyboard or the like, the destination may be considered to be "selected". Processing of determining whether or not to close the destination table screen 210 is performed when a destination is selected from the destination table 211 in a state where the destination table screen 210 is opened.

FIG. 4 illustrates an example of the transmission history information in the information processing apparatus. The transmission history information illustrated in FIG. 4 includes seven history records. Each history record includes a history number and transmission destination information. The history number is a serial number given to the history record, and a number starting from 1 is given in order from the history record closest to the current time point. The transmission destination information indicates a list of destinations to which an electronic mail as a transmission target in transmission represented by the corresponding history record is transmitted, and includes information on an order in which the user selects the destinations. For example, the history record having a history number of 1 indicates that the user selects destinations in order of a destination B and a destination C, and then presses the transmission button 206. In the example of FIG. 4, it is assumed that destinations A, B, C, D, and . . . are arranged in this order in the destination table 211 displayed on the destination table screen 210. Destination candidates as many as can be displayed on the screen 210 are displayed in order from the destination A to be arranged from the top, on the destination table screen 210 opened when the destination table call button 204 has been pressed. A destination candidate such as a destination F, that is not displayed on the screen 210 at that time is set to be displayed on the destination table screen 210 by pressing the downward scroll button 216.

The example of FIG. 4 is an example in which the number of history records that may be included in the transmission history information is limited to a predetermined number. In a case where the history records that may be included in the transmission history information are limited not by the number but by the age of the transmission date and time from the present, the transmission date and time on which transmission related to each history record has been performed is recorded together in the transmission history information.

In the first example, a case where, when the transmission history information in the information processing apparatus is in the state illustrated in FIG. 4, the user opens the destination table screen 210 and selects a destination candidate group in the destination table 211 on the destination table screen 210 in order of the destinations A, B, and C is considered.

In this case, at a time point at which the user selects the destination A on the destination table screen 210, the number of the selected destinations is still one, and thus Condition 3 as described above is not satisfied. Then, at a time point at which the user selects the destination B on the destination table screen 210, the destinations selected by the user are the destinations A and B in this order. However, a history record having transmission destination information corresponding to this order is not included in the transmission history information (see FIG. 4). Therefore, Condition 3 is not satisfied even at this point. Then, at a time point at which the user selects the destination C on the destination table screen 210, the destinations selected by the user are the destinations A, B, and C in that order. A history record that has a history number of 2 and indicates that a group of destinations identical to the above selected destinations is selected in order identical to the above order is provided in the transmission history information (see FIG. 4). Because Condition 3 is satisfied at this point, the information processing apparatus closes the destination table screen 210 that has been displayed until that and brings the screen to be displayed back to the mail transmission screen 200 being the transition source.

Figure 5:
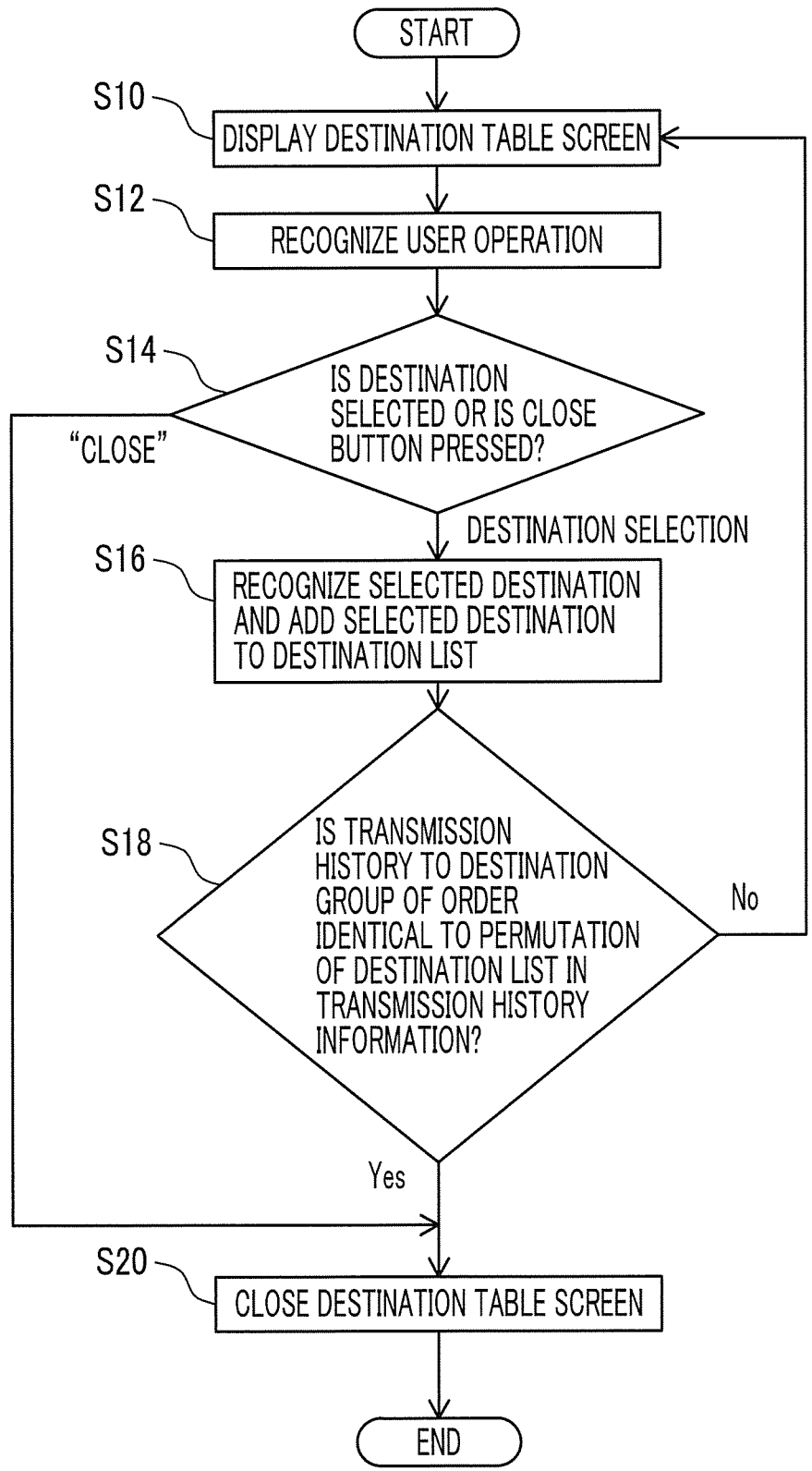
FIG. 5 is a diagram illustrating a processing procedure in a first example.

FIG. 5 illustrates a processing procedure performed by the information processing apparatus (in particular, the processor 102) for the first example. In order to perform the procedure, the information processing apparatus holds, in the memory 104, a destination list representing a permutation of destinations selected by the user for this transmission. The procedure is started when the user presses the destination table call button 204 in the mail transmission screen 200.

In the procedure, the processor 102 firstly performs a process of displaying the destination table screen 210 on the display device of the information processing apparatus (S10). Then, the processor 102 recognizes a user operation on the destination table screen 210 (S12), and performs a process corresponding to the recognized operation. In the procedure of FIG. 5, in order to avoid complication, a process in a case where the user presses the scroll button 214 or 216 is omitted.

Then, the processor 102 determines whether the user operation recognized in S12 is selection of a destination from the destination table 211 or pressing of the close button 218 (S14). In a case where the close button 218 is pressed, the processor 102 closes the destination table screen 210 (S20).

In a case where the user operation recognized in S12 is the selection of the destination, the processor 102 adds the selected destination to the end of the destination list held in the memory 104 (S16).

Then, the processor 102 determines whether or not a history record indicating a permutation identical to a permutation of destinations indicated by the destination list after the destination is added in S16 is included in the transmission history information (S18). For example, in a case where the destination list is a permutation in which the destinations A, B, and C are arranged in this order, in S18, it is determined whether or not a history record including a permutation in which only the destinations A, B, and C are arranged in this order, as transmission destination information, is included. In a case where the determination result in S18 is No, the processor 102 continues to display the destination table screen 210 (S10) and receives a further user operation on the destination table screen 210 (S12).

In a case where the determination result in S18 is Yes, the processor 102 closes the destination table screen 210 (S20) and performs a process of displaying the mail transmission screen 200 on the display device.

In S18, the reason of determining whether or not the history record having an order that coincides with an order of the user selecting the destinations is provided is considered as follows. That is, in an operation of selecting the destination while scrolling the destination table 211, in a case where the identical plurality of destinations are selected, it is considered that a possibility of selecting the destinations in the identical order is high.

In the procedure of FIG. 5, in a case where a second history record in which one or more destinations are added to the end of the destination permutation in the first history record is provided, whether or not the destination table screen 210 is closed at a time point at which the destination permutation selected this time by the user coincides with the destination permutation in the first history record becomes a problem. For example, the above situation occurs a time point at which the user selects the destination A from the destination table screen 210 and then selects the destination B in a situation in which there are a first history record indicating that transmission to two destinations selected in order of the destinations A and B has been performed, and a second history record indicating that transmission to three destinations selected in order of the destinations A, B, and C has been performed. At this point, the destination list in this time coincides with the destination permutation in the first history record, but is a portion of the destination permutation in the second history record. Therefore, it is necessary to determine whether to close the destination table screen 210 at that time, or to give priority to the possibility that the identical destination group to the second history record is selected and thus not close the destination table screen 210 at that time.

One criterion for the determination may be a criterion that the priority is given to a new (that is, later transmission date and time) history record may be used. The criterion is applied to the above-described example as follows. That is, in a case where the first history record is newer than the second history record, the processor 102 closes the destination table screen 210 at a time point at which the destination B is selected. Conversely, in a case where the second history record is newer, the processor 102 does not close the destination table screen 210 at a time point at which the destination B is selected.

As another criterion, a criterion that the priority is given to history records in which the destination permutations are identical to each other, and of which the number is large may be used. For example, a situation as follows is considered. That is, in the situation, three history records indicating that transmission to two destinations selected in order of the destinations A and B has been performed, and one history record indicating that transmission to three destinations selected in order of the destinations A, B, and C has been performed are provided. At a time point the user selects destinations in order of the destinations A and B in such a situation, the destination list coincides with the destination permutation in the former history record, and the number of the former records is more than the number of the latter records. Thus, the processor 102 closes the destination table at this time point.

In the procedure of FIG. 5, in S18, the history records in which not only the combination of the destinations selected by the user, but also the order of the destinations being selected are identical are searched. However, this is only an example.

As another example, there is an example in which coinciding with the order is not required for history records to be searched. In this example, in S18, the processor 102 searches for a history record including the identical combination of destinations to the combination of destinations in the destination list after the process of S16, as transmission destination information. Also in this example, in a case where the destination combination in the first history record is obtained by adding another destination to the destination combination in the second history record, a history record of the two history records, that coincides with the combination of destinations selected by the user in this transmission in order to close the destination table screen 210 becomes a problem. This problem may be handled in accordance with a criterion that the priority is given to a new history record or a criterion that the priority is given to history records of which the number is large, similar to the above-described case considering the permutation.

In the example described above, the condition for closing the destination table screen 210 is that even one history record indicating that transmission to only a destination group identical to a destination group selected this time by the user is searched. The condition may be that N pieces (N is an integer of 2 or more) are searched instead of one piece.

Example 2 of Control

A second example of control for closing the destination table screen 210 will be described with reference to FIGS. 6 and 7.

In the second example, when a single destination is selected from the user on the destination table screen 210, in a case where a condition (referred to as Condition 4) that transmission history information indicates that transmission in which the above selected destination is set to the only destination has been previously performed the number of times equal to or more than a threshold value is satisfied, the destination table screen 210 is closed.

Figure 6:
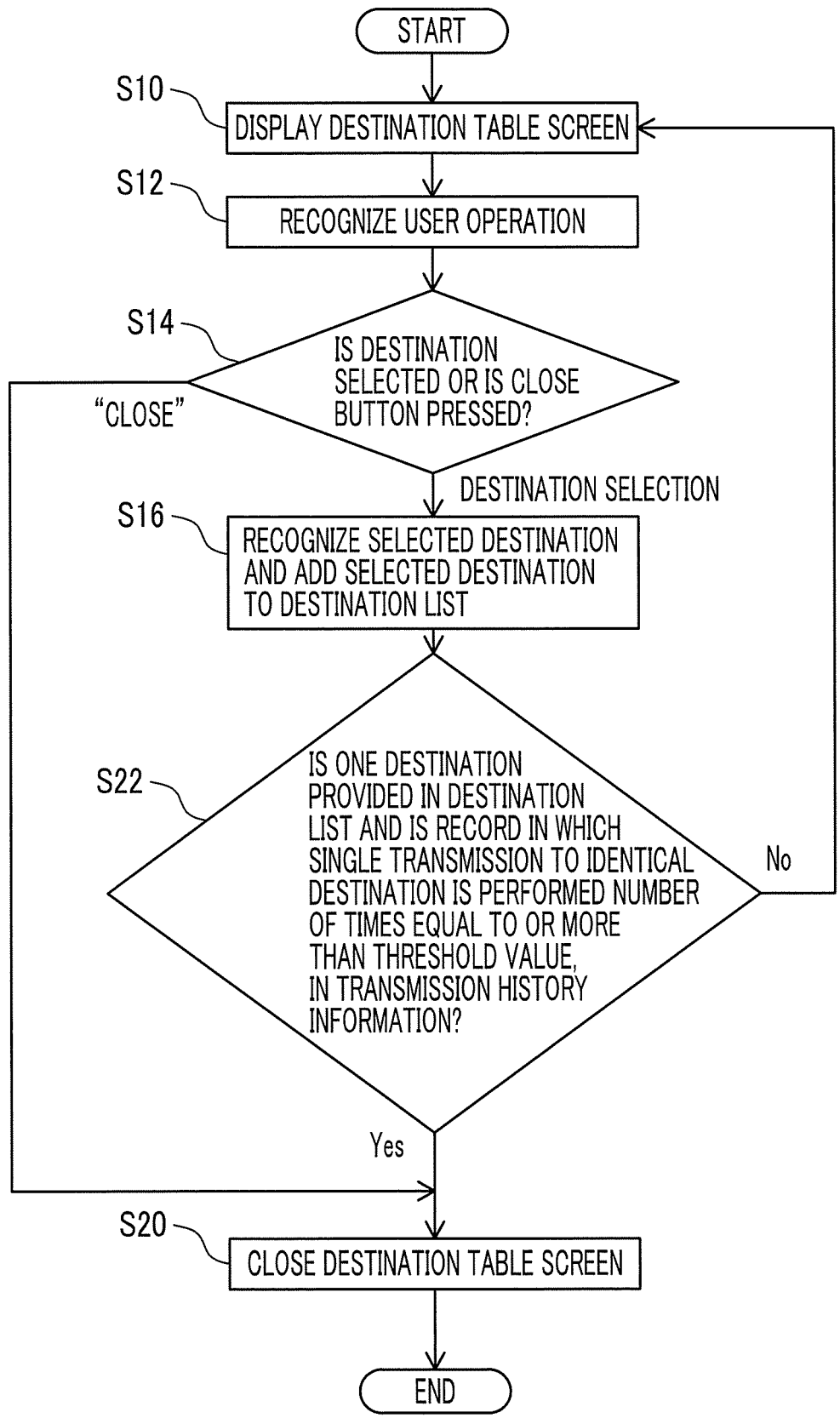
FIG. 6 is a diagram illustrating a processing procedure in a second example.

FIG. 6 illustrates a processing procedure in the second example. The processing procedure will be described using the example of the transmission history information illustrated in FIG. 7. The procedure in FIG. 6 is started when the user presses the destination table call button 204 in the mail transmission screen 200. Steps other than S22 in the procedure of FIG. 6 are identical to the steps of the identical reference signs in the procedure of FIG. 5. Description of steps having the identical reference signs to the steps in the procedure of FIG. 5 will be omitted.

In the procedure of FIG. 6, after S16, the processor 102 determines whether or not both two conditions as follows are satisfied (S22). The first condition is that there is one destination in the destination list at that time. The condition is satisfied at a time point at which the user selects the first destination in this transmission. However, the condition is not satisfied at a time point at which the second and the subsequent destinations are selected. The second condition is that history records including the destination as the only destination in the destination list, of which the number is equal to or more than a predetermined threshold value, are provided in the transmission history information. In a case where even one of the two conditions is not satisfied, the determination result in S22 is No, and the processor 102 causes the process to return to S10, continues to display the destination table screen 210, and waits for the next operation from the user. On the other hand, in a case where both the two conditions are satisfied, the determination result of S22 is Yes. In this case, the processor 102 closes the destination table screen 210 (S20).

For example, a case where the user opens the destination table screen 210 and firstly selects the destination A in a situation in which the transmission history information illustrated in FIG. 7 is provided is considered. Here, it is assumed that the threshold value used for the determination in S22 is three. In this case, the destination A selected by the user is the only destination in the destination list at that time, and history records in which the destination A is set to only the destination and of which the number is equal to or more than the threshold value (that is, three) are provided in the transmission history information. Therefore, the processor 102 sets the determination result in S22 to Yes, causes the process to proceed to S20, and closes the destination table screen 210.

As described above, in this second example, in a case where transmission to a destination identical to the destination firstly selected by the user in this transmission has been previously and independently performed frequently (that is, the number of times equal to or more than the threshold value), the processor determines that the above transmission is a transmission to only the destination, and automatically closes the destination table screen 210.

As a modification example of the second example, a case where the second condition used in S22 is changed as follows is considered. That is, in the modification example, as the second condition, a condition that all the recent (that is, the order closer to the present) history records of which the number is equal to or more than the threshold value in a history record group of which the transmission destination information includes the destination selected by the user in the transmission history information do not include a destination other than the above destination is used. For example, a case where the destination firstly selected this time by the user is the destination A, the transmission history information is as illustrated in FIG. 7, and the threshold value is 3 is used as an example. In this example, in the transmission history information, four history records including the destination A are provided, and the latest three times of transmissions are single transmissions to the destination A. Thus, since the second condition in the modification example is satisfied, the determination result of S22 is Yes. A case where the history record having a history number of 1, illustrated in FIG. 7, includes the destination A in addition to the destinations B and C illustrated as destinations. In this case, in a case where the user selects the destination A in this transmission, the destination in the latest history record including the destination A is not alone.

Thus, the second condition is not satisfied. Accordingly, in this case, the determination result of S22 is No. The modification example focuses on the situation of destination selection in the latest transmission in a case of evaluating the possibility that the destination selected this time is a destination of single transmission.

Example 3 of Control

This example corresponds to a case where data as a transmission target to the destination selected by the user is a photographic image.

Image data of a photograph showing a plurality of persons may be attached to, for example, an electronic mail and transmitted to the plurality of persons. In a third example, in a case where the data designated by the user as the transmission target in this transmission is image data of a photograph, the destination table screen 210 is closed at a time point at which all the persons in the photograph are selected as destinations in the process of the user selecting destinations.

That is, in the third example, the destination table screen 210 is closed in a case where a condition as follows is satisfied: a single person or a plurality of persons included in an image transmitted to a single or a plurality of destinations selected by the user are identical to a single or a plurality of persons indicated by the single or the plurality of destinations.

Figure 8:
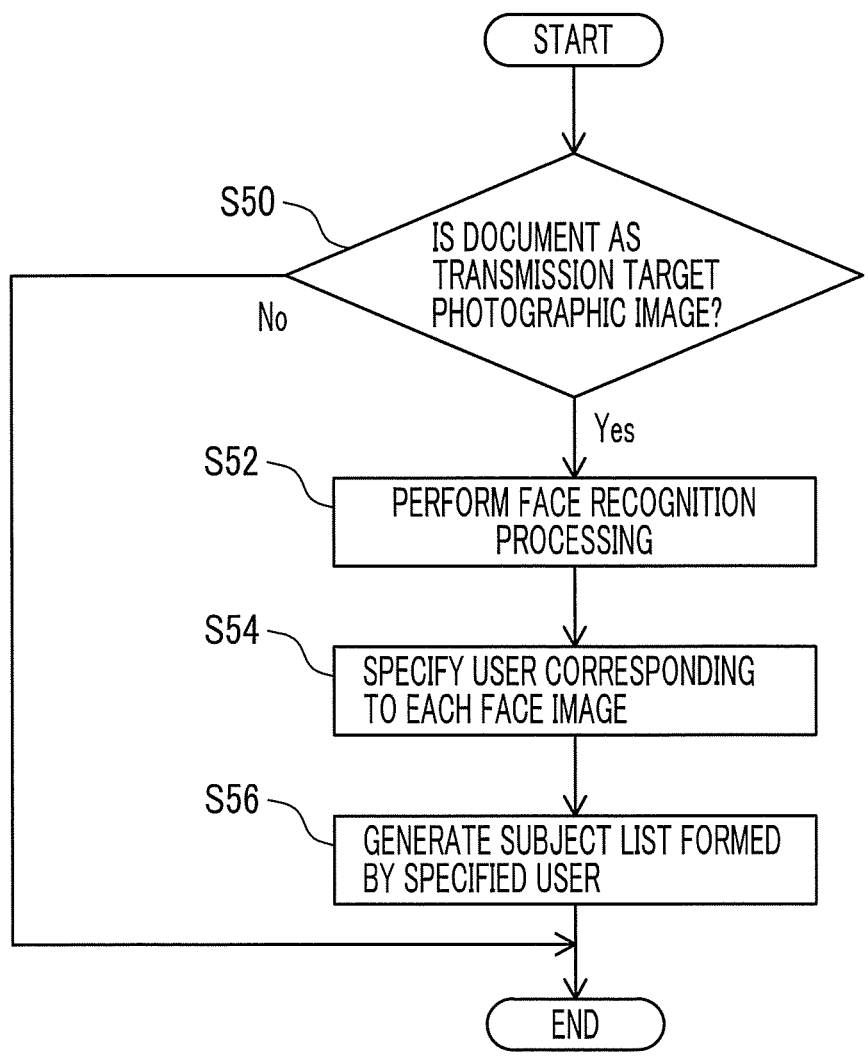
FIG. 8 is a diagram illustrating a procedure of processing of generating a subject list in a third example.
Figure 9:
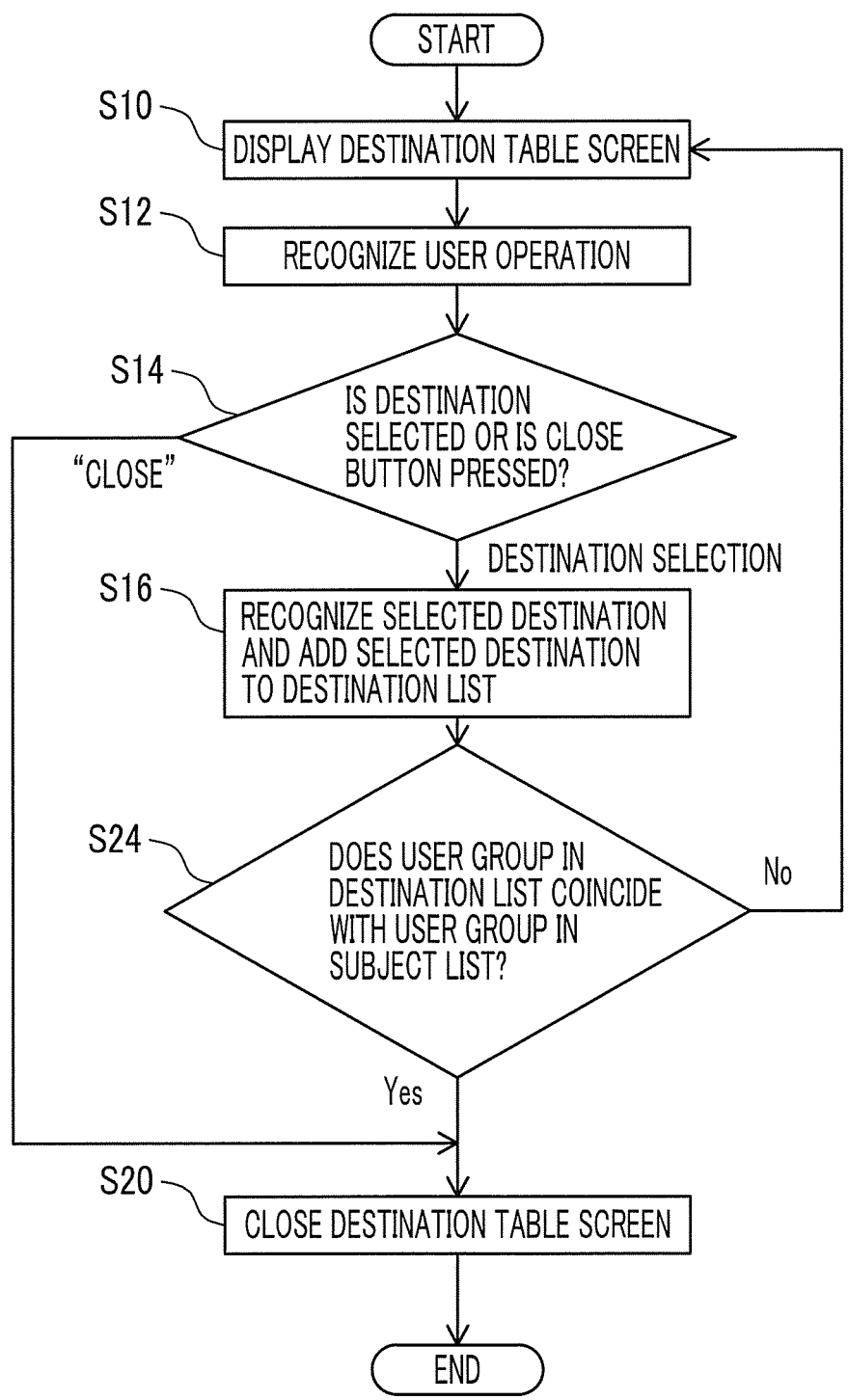
FIG. 9 is a diagram illustrating a procedure of display control of the destination table screen in the third example.

FIGS. 8 and 9 illustrate the processing procedure in the third example.

The processor 102 performs the procedure of FIG. 8 in a case where a document as a transmission target is input or designated by the user. In this procedure, firstly, the processor determines whether or not the document is a photographic image (S50). For example, in a case where the input source of the document as the transmission target is a scanner (that is, in a case where an image obtained by scanning the document is transmitted), the processor determines a document as a transmission target to be a photographic image. In a case where a file saved in the information processing apparatus is designated as a document as a transmission target, the processor determines whether or not the file is a photographic image, based on the data format of the file indicated by the file extension of the file. In a case where the determination result of S50 is No, the process in FIG. 8 ends. In this case, the content of a subject list for the document as this transmission target is empty. The subject list is a list of user IDs (ID is identification information) of subject persons appearing in the photographic image as the transmission target.

In a case where the determination result in S50 is Yes, the processor 102 performs known face recognition processing on the document image (S52). With the processing, an image corresponding to a human face is specified from the image. Then, the processor 102 specifies the user ID of a user corresponding to the face image for each of one or more face images recognized from the document image in S52 (S54). For the specifying, the information processing apparatus has a database in which the user ID and face information of each user are registered, or refers to such a database. The information on the face of the user registered in the database is, for example, one or more face images (for example, face images captured from several different directions) obtained by capturing an image of the face of the user. The database may hold a textured three-dimensional model obtained by pasting a texture of a face image onto a three-dimensional model of a user face (for example, a surface model), as face information. In S54, the processor 102 specifies the user corresponding to the face image by matching the face image with the face information of each registered user in the database, for each face image recognized in S52.

Then, the processor 102 generates a subject list including the user IDs of the users specified in S54 (S56). The subject list is stored in the memory 104 and referred to in the procedure of FIG. 9 described below.

In a case where no face image can be recognized from the document image in S52, or in a case where no user ID corresponding to the face image in the image can be identified in S54, the subject list becomes empty.

The processor 102 performs the procedure of FIG. 9 when the user presses the destination table call button 204 in the mail transmission screen 200. Steps other than S24 in the procedure of FIG. 9 are identical to the steps of the identical reference signs in the procedure of FIG. 5. Description of steps having the identical reference signs to the steps in the procedure of FIG. 5 will be omitted.

In the procedure, after S16, the processor 102 determines whether or not a user ID group in the destination list (that is, the list of users selected by the user in this transmission) coincides with a user ID group in the subject list generated in the procedure of FIG. 8 (S24). In a case where the determination result in S24 is No, the processor 102 causes the process to return to S10 and continues to display the destination table screen 210, and waits for the next operation from the user. On the other hand, in a case where the determination result in S24 is Yes, the processor 102 closes the destination table screen 210 (S20).

In the example, because the destination table screen 210 is automatically closed at a time point at which all the persons appearing in the photographic image are selected as the destinations, the labor of a user operation is reduced in a typical usage scene where the photographic image is transmitted to each of the subjects.

Example 4 of Control

Similar to the third example described above, this example corresponds to a case where the data as a transmission target to the destination selected by the user is a photographic image.

In the third example, the individual person as the subject appearing in the photographic image is identified. However, in a fourth example, the person is not identified, and the number of persons appearing in the photographic image is simply obtained. In a case where the data designated as this transmission target by the user is image data of a photograph, the destination table screen 210 is closed at a time point at which destinations of which the number is equal to the number of persons appearing in the photograph are selected in the process of the user selecting destinations.

That is, in the fourth example, the destination table screen 210 is closed in a case where a condition as follows is satisfied: the number of persons included in an image to be transmitted to a single or a plurality of destinations selected by the user is equal to the number of destinations included in the single or the plurality of destinations.

In the example, in a case where a document as a transmission target is input or designated by the user, the processor 102 determines whether the document is image data. In a case where the document is image data, the processor performs known face recognition processing on the image data. The processor 102 obtains the number of faces in the image data recognized by the face recognition processing, and stores the obtained number in the memory 104.

Figure 10:
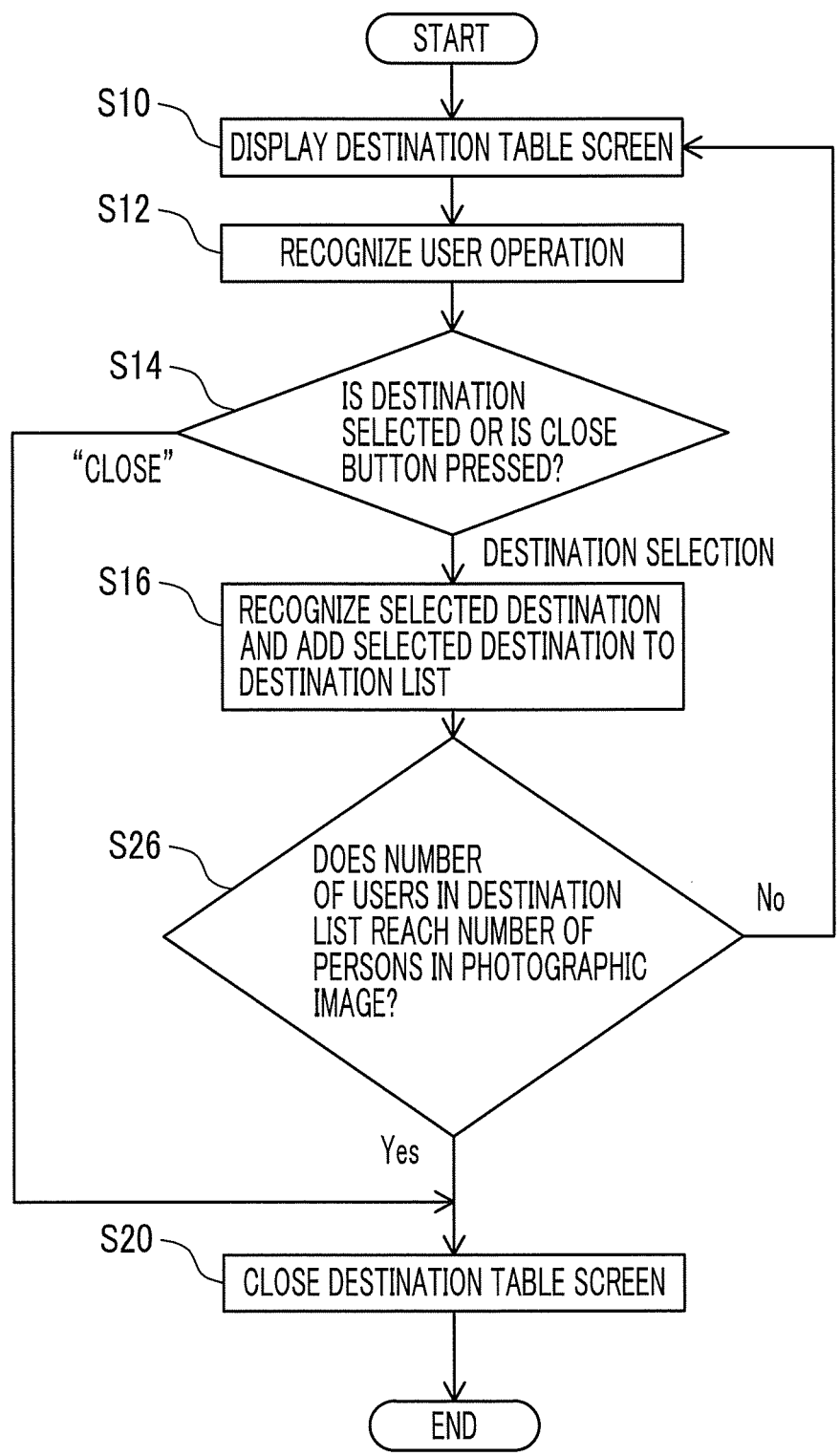
FIG. 10 is a diagram illustrating a procedure of the display control of the destination table screen in a fourth example.

The processor 102 performs the procedure of FIG. 10 when the user presses the destination table call button 204 in the mail transmission screen 200. Steps other than S26 in the procedure of FIG. 10 are identical to the steps of the identical reference signs in the procedure of FIG. 5. Description of steps having the identical reference signs to the steps in the procedure of FIG. 5 will be omitted.

In the procedure, after S16, the processor 102 determines whether or not the number of user IDs in the destination list (that is, the list of users selected by the user in this transmission) is equal to the number of persons (that is, the number of faces in the image data as the transmission target) stored in the memory 104 (S26). In a case where the determination result in S26 is No, the processor 102 causes the process to return to S10 and continues to display the destination table screen 210, and waits for the next operation from the user. On the other hand, in a case where the determination result in S26 is Yes, the processor 102 closes the destination table screen 210 (S20).

In the example, because the destination table screen 210 is automatically closed at a time point at which the destinations of which the number is equal to the number of persons appearing in the photographic image are selected, the labor of a user operation is reduced in a typical usage scene where the photographic image is transmitted to all the subjects.

Example 5 of Control

This example is an example in a case where destination candidates displayed in the destination table 211 in the destination table screen 210 include two types of destination candidates which are a first type of destination candidate indicating one destination and a second type of destination candidate in which a plurality of destinations are grouped.

Here, the destination of "one destination" or a "plurality of destinations" refers to a single destination address such as a single mail address, a single telephone number (that is, a facsimile number), and a single IP address. The first type of destination candidate represents a single destination address. On the other hand, the second type of destination candidate is obtained by grouping and naming a plurality of "destinations", that is, a plurality of destination addresses into one group. For example, when a group formed by mail addresses of all members in an intellectual property department of a certain company is named "Intellectual Property Department" and registered in the destination table 211, the destination candidate of the name "Intellectual Property Department" in the destination table 211 corresponds to the second type of destination candidate.

In the following description, in order to avoid the ambiguity of the names of the two types of destination candidates, the first type of destination candidates are referred to as individual destination candidates, and the second type of destination candidates are referred to as group destination candidates.

It is considered that the group destination candidate is created, for example, for each department of the company or for each task team dynamically configured in the company.

In a fifth example, the information processing apparatus has two types of destination tables 211.

A first type of destination table is a destination table in which only a destination candidate group selected from all the destination candidates registered in the information processing apparatus is registered. The destination table is referred to as a "favorite" destination table. Destination candidates frequently used by users who operate the information processing apparatus are selected and registered in the "favorite" destination table. There may be a usage form in which all users who use the information processing apparatus share one "favorite" destination table, and use by using the "favorite" destination table dedicated to each user registered in the information processing apparatus. The destination candidates included in the "favorite" destination table are referred to as "favorite" destination candidates.

The second type of destination table is a destination table in which at least a destination candidate group which is not registered in the "favorite" destination table among all the destination candidates registered in the information processing apparatus is registered. For example, the second type of destination table may include only the destination candidate group that is not registered in the "favorite" destination table among all the destination candidates registered in the information processing apparatus. In addition to the destination candidate group, the second type of destination table may include one or more destination candidates included in the "favorite" destination table (for example, the second type of destination table may include all destination candidates registered in the information processing apparatus). In the following, the second type of destination table will be referred to as a "general" destination table in comparison with "favorite".

Figure 11:
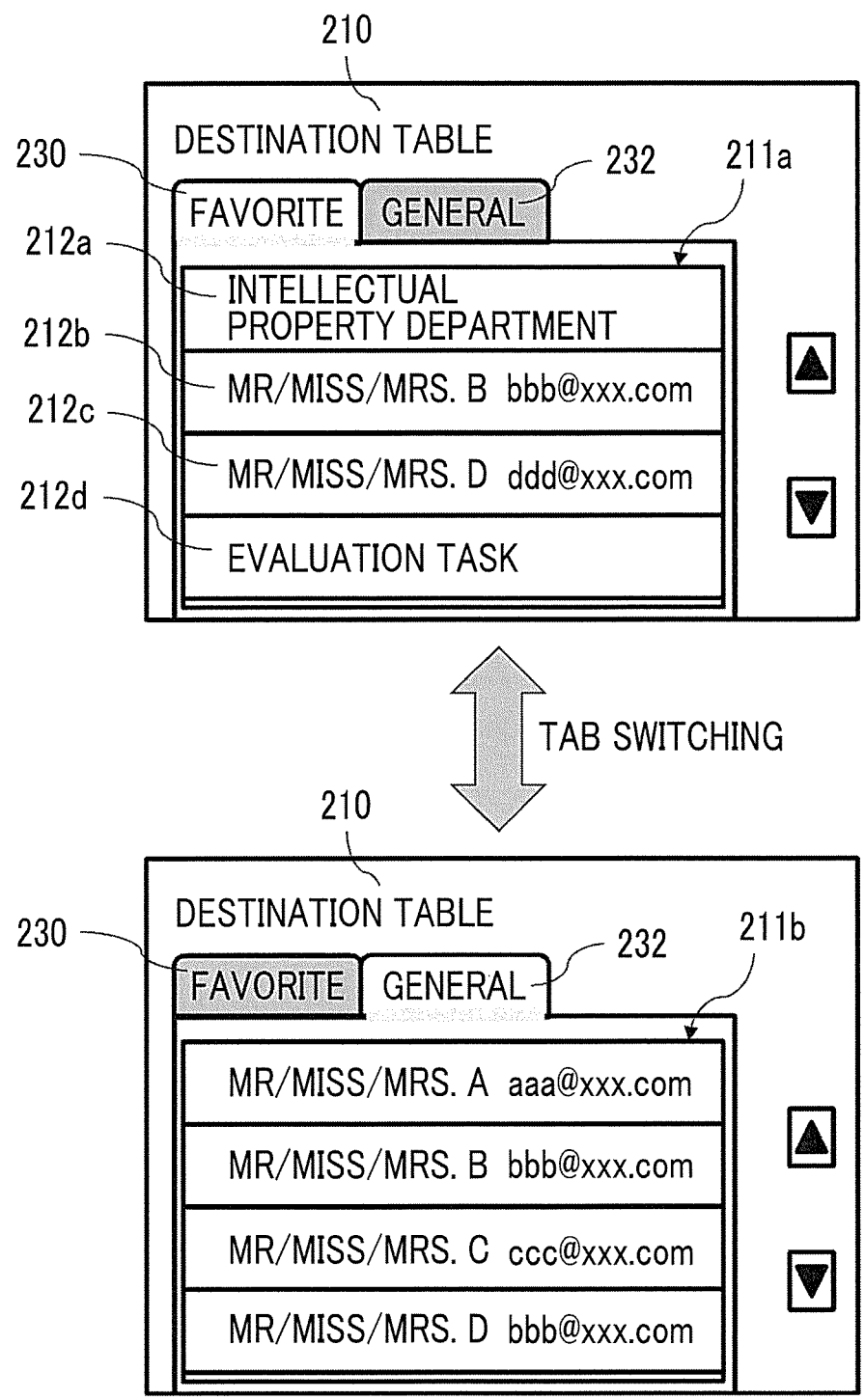
FIG. 11 is a diagram illustrating a screen of switching and displaying a destination table between a "favorite" destination table and a "general" destination table in a fifth example.

As illustrated in FIG. 11, a "favorite" destination table 211a or a "general" destination table 211b is displayed in the destination table screen 210. In the example illustrated in FIG. 11, in a case where a tab 230 is selected, the "favorite" destination table 211a is displayed. In a case where the tab 232 is selected, the "general" destination table 211b is displayed.

Destination candidates 212a and 212d in the "favorite" destination table 211a are group destination candidates, and destination candidates 212b and 212c are individual destination candidates. Although not illustrated, the group destination candidates may be included in the "general" destination table 211b. In the example in which the "favorite" destination table 211a is prepared for each user, the "favorite" destination table 211a of a user who has logged in to the information processing apparatus is displayed in the destination table screen 210.

In one example, the processor 102 displays the "favorite" destination table 211a on the destination table screen 210 which is firstly displayed when the destination table call button 204 in the mail transmission screen 200 is pressed. The "general" destination table 211b generally contains a huge number of destination candidates, but the "favorite" destination table 211a generally contains far fewer destination candidates. In a case where a destination intended by the user is included in the "favorite" destination table 211a, the destination may be found much earlier from the "favorite" destination table 211a. The probability that the destination intended by the user is included in the "favorite" destination table 211a is high. In a case where the destination intended by the user is not in the "favorite" destination table 211a, the user selects the tab 232 to open the "general" destination table 211b, and searches for the intended destination from the "general" destination table.

The destination table screen 210 in the fifth example is not limited to the screen in which the "favorite" destination table 211a and the "general" destination table 211b are switched and displayed as separate screens (FIG. 11 is one example thereof). Instead, for example, there is a method of preparing one large destination table 211 in which the destination candidate group in the "general" destination table 211b is arranged after the destination candidate group in the "favorite" destination table 211*a* and displaying the destination table in the destination table screen 210. In this method, the "favorite" destination candidate group is firstly displayed in the destination table screen 210 that is firstly displayed when the destination table call button 204 is pressed. In a case where there is no intended destination candidate group displayed in the destination table screen 210, the user scrolls the displayed destination candidate group with the scroll button to search for an intended destination candidate. As the scrolling proceeds, the destination candidate group in the "general" destination table 211*b* is sequentially displayed in the destination table screen 210, and the user selects an intended destination from the destination candidate group.

In the fifth example, in a case where the user selects the group destination candidate in the "favorite" destination candidate group displayed in the destination table screen 210 in the selection of the first destination in this transmission, the destination table screen 210 is closed.

In a case where the user wants to send an electronic mail to all members of a group, and a group destination candidate representing the group is in the destination table, the group destination candidate is required to be selected as the destination of the electronic mail. In a case of considering a case of sending a mail to all members of the group and a case of sending a mail to a destination group obtained by adding other destinations to all the members of the group, it is considered that the former case occurs more frequently in view of the purpose of preparing the group destination candidates. In a case where a situation in which another individual destination candidate is selected in addition to the known group destination candidate, and a mail is transmitted occurs frequently, a possibility of an operation in which the individual destination candidate is added as a member of the group destination candidate is high. It is considered that a possibility that, among many group destination candidates registered in the information processing apparatus, the group destination candidate intentionally registered in the "favorite" (that is, frequently used) is selected by the group alone as compared with the group destination candidate which is not "favorite" is high. For this reason, in a case where the group destination candidate is selected from the "favorite" destination candidate group, the destination table screen 210 is closed.

Figure 12:
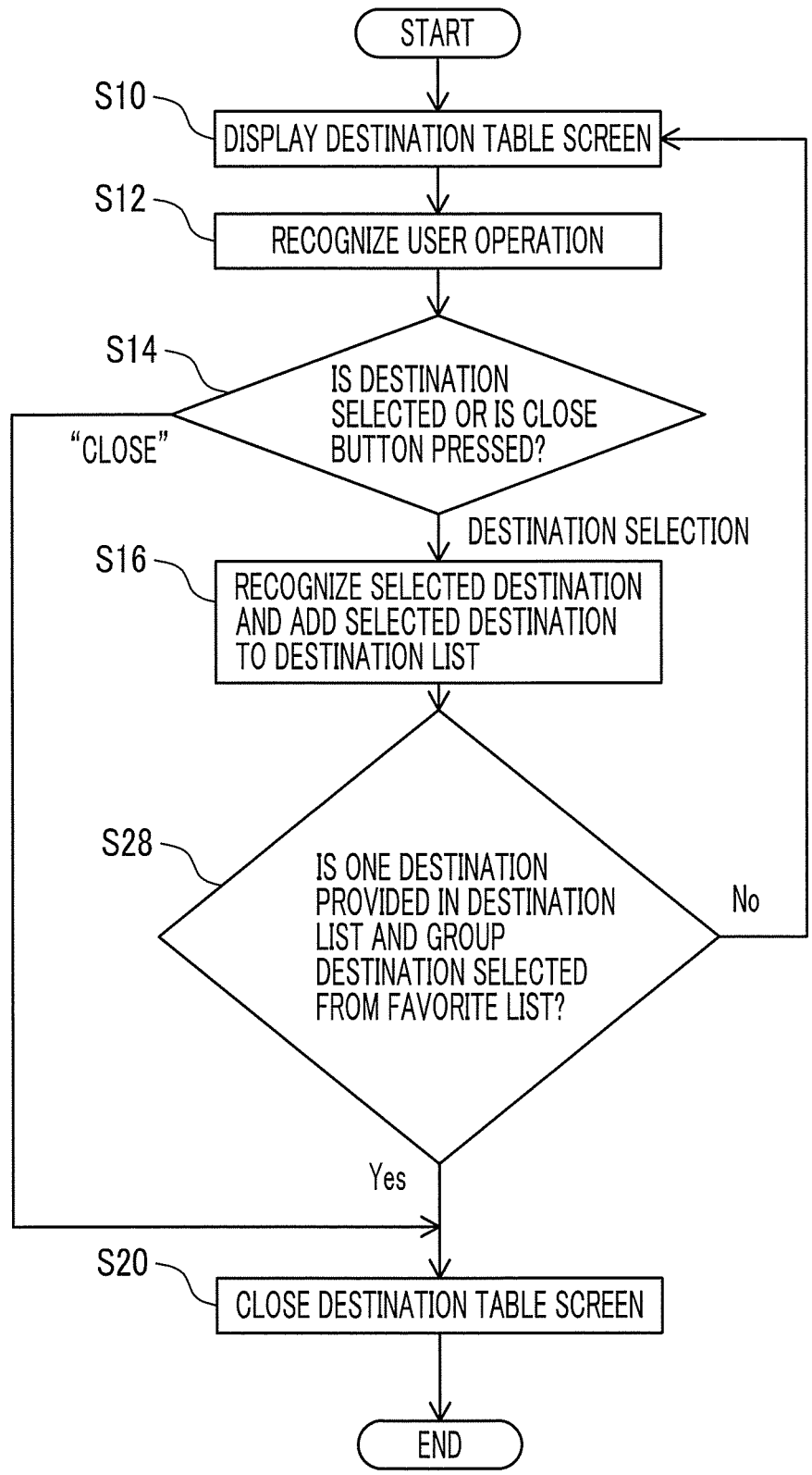
FIG. 12 is a diagram illustrating a processing procedure in the fifth example.

In the example, the processor 102 performs the procedure of FIG. 12 when the user presses the destination table call button 204 in the mail transmission screen 200. Steps other than S28 in the procedure of FIG. 12 are identical to the steps of the identical reference signs in the procedure of FIG. 5. Description of steps having the identical reference signs to the steps in the procedure of FIG. 5 will be omitted.

In the procedure, after S16, the processor 102 determines whether both conditions that the number of destinations in the destination list is one and that the destination is the group destination candidate selected from the "favorite" destination candidate group are satisfied (S28). In a case where the determination result in S28 is No, the processor 102 causes the process to return to S10 and continues to display the destination table screen 210, and waits for the next operation from the user. On the other hand, in a case where the determination result in S28 is Yes, the processor 102 closes the destination table screen 210 (S20).

Variations of Example 5 of Control

In a case of considering an information processing apparatus or the like in which the destination candidates are not distinguished between the "favorite" destination candidates and destination candidates which are not favorite, when the user selects a group destination candidate from the destination table screen 210, the processor 102 may automatically close the destination table screen 210.

As another example, when the user selects the "favorite" destination candidate from the destination table screen 210, the processor 102 may automatically close the destination table screen 210.

Example 6 of Control

In this example, it is determined whether or not to close the destination table screen 210 based on the tendency of the destination selection in a case where the user has previously performed transmission from the information processing apparatus. More specifically, in this example, in a case where the user has previously and frequently performed transmission to a single destination (that is, transmission with one destination), the destination table screen 210 is closed at a time point at which the user selects the first destination in this transmission from the destination table screen 210. That is, in a case where it is understood that a tendency that the user performs transmission to a single destination is strong, from the previous transmission history, the destination table screen 210 is closed at a time point at which one destination is selected.

In this example, the information processing apparatus includes a "sender" field in the transmission history information, as illustrated in FIG. 13. In the "sender" field, the user ID of a user who has issued an instruction of transmission indicated by the history record is recorded.

Figure 14:
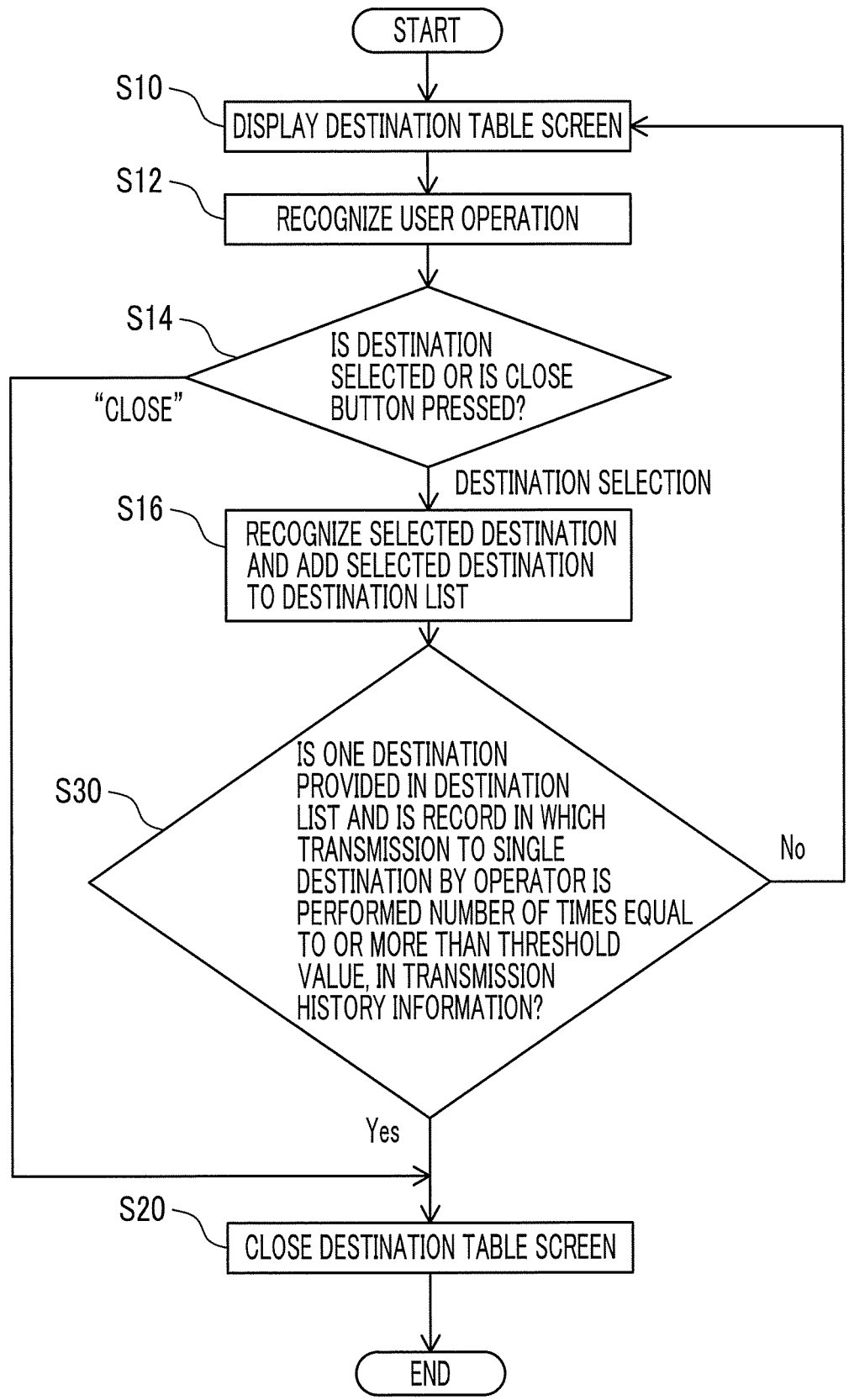
FIG. 14 is a diagram illustrating a processing procedure in a sixth example.

In the example, the processor 102 performs the procedure of FIG. 14 when the user presses the destination table call button 204 in the mail transmission screen 200. Steps other than S30 in the procedure of FIG. 14 are identical to the steps of the identical reference signs in the procedure of FIG. 5. Description of steps having the identical reference signs to the steps in the procedure of FIG. 5 will be omitted.

In the procedure, after S16, the processor 102 determines whether both two conditions as follows are satisfied together (S30). The first condition is that the number of destinations in the destination list is one. The second condition is that the number of history records for a single destination among history records in which the user is a sender in the transmission history information is equal to or more than a predetermined threshold value. In a case where the determination result in S30 is No, the processor 102 causes the process to return to S10 and continues to display the destination table screen 210, and waits for the next operation from the user. On the other hand, in a case where the determination result in S30 is Yes, the processor 102 closes the destination table screen 210 (S20).

As a specific example, a case where the transmission history information is in the state illustrated in FIG. 13 and the threshold value used in S30 is three times is considered. In this case, it is assumed that a user "A" logs in to the information processing apparatus and opens the destination table screen 210 by pressing the destination table call button 204 on the mail transmission screen 200. In this case, three history records for a single destination in which the sender is "A" are provided in the transmission history information. Thus, the determination result of S30 becomes Yes at a time point at which the user "A" selects the first destination from the destination table screen 210, and then the destination table screen 210 is closed.

As a modification example of the sixth example, a case where the second condition used in S30 is changed as follows is considered. That is, in the modification example, as the second condition, a condition that all history records of which the number is equal to or more than the latest threshold value in the history record group in which the user is a sender in the transmission history information are for the single destination is used. The modification example focuses on the latest tendency of the destination selection by the sender.

Hitherto, the exemplary embodiment of the present invention has been described above by using the case of mail transmission as an example. However, the method of the above-described exemplary embodiment may be applied to transmission using a protocol other than the electronic mail, for example, may be applied to facsimile transmission or transmission using the FTP, or other data transfer protocols.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
    display a screen on which a plurality of destination candidates and a GUI component that receives an instruction to end selection are displayed,
    receive the selection of the destination from the plurality of destination candidates displayed on the screen,
    end the display of the screen in a case where the instruction to end the selection is received by the GUI component, and
    end the display of the screen even though the instruction to end the selection is not received by the GUI component, when a single or a plurality of selected destinations satisfy a predetermined condition, wherein the condition is a condition to be satisfied by the single or the plurality of selected destinations for transmission history information.

2. The information processing apparatus according to claim 1,
    wherein the condition is that the transmission history information indicates that transmission to only a plurality of destinations identical to the plurality of selected destinations has been previously performed.

3. The information processing apparatus according to claim 2, wherein the condition is that the transmission history information indicates that
    transmission has been performed by receiving selection of a plurality of the identical destinations in an order identical to an order in which the plurality of destinations are selected.

4. The information processing apparatus according to claim 1,
    wherein the condition is that the transmission history information indicates that transmission in which a single destination identical to the single selected destination is set to an only destination has been previously performed the number of times equal to or more than a threshold value.

5. An information processing apparatus comprising:
a processor configured to
    display a screen on which a plurality of destination candidates and a GUI component that receives an instruction to end selection are displayed,
    receive the selection of the destination from the plurality of destination candidates displayed on the screen,
    end the display of the screen in a case where the instruction to end the selection is received by the GUI component, and
    end the display of the screen even though the instruction to end the selection is not received by the GUI component, when a single or a plurality of selected destinations satisfy a predetermined condition, wherein the condition is that the number of persons included in an image to be transmitted to the single or the plurality of selected destinations is equal to the number of destinations included in the single or the plurality of destinations.

6. The information processing apparatus according to claim 5,
    wherein the condition is that a single or a plurality of persons included in the image to be transmitted to the single or the plurality of selected destinations coincide with a single or a plurality of persons indicated by the single or the plurality of destinations.

7. A non-transitory computer readable medium storing a program causing a computer to
    display a screen on which a plurality of destination candidates and a GUI component that receives an instruction to end selection are displayed;
    receive the selection of the destination from the plurality of destination candidates displayed on the screen;
    end the display of the screen in a case where the instruction to end the selection is received by the GUI component; and
    end the display of the screen even though the instruction to end the selection is not received by the GUI component, when a single or a plurality of selected destinations satisfy a predetermined condition, wherein the condition is a condition to be satisfied by the single or the plurality of selected destinations for transmission history information.

8. An information processing apparatus comprising:
a processor configured to
    display a screen on which a plurality of destination candidates and a GUI component that receives an instruction to end selection are displayed;
    receive the selection of the destination from the plurality of destination candidates displayed on the screen, from a user,
    end the display of the screen in a case where the instruction to end the selection is received by the GUI component; and
    end the display of the screen even though the instruction to end the selection is not received by the GUI component, in a case where transmission history information indicates that the user who performs the selection has previously issued an instruction of transmission to one destination the number of times equal to or more than a threshold value.

* * * * *